July 8, 1924.

D. A. FLANIGAN

HELICOPTER

Filed May 31, 1923 2 Sheets-Sheet 2

Inventor
David A. Flanigan
By [signature]
Attorney

Patented July 8, 1924.

1,500,807

UNITED STATES PATENT OFFICE.

DAVID A. FLANIGAN, OF VIRGIN, UTAH.

HELICOPTER.

Application filed May 31, 1923. Serial No. 642,548.

*To all whom it may concern:*

Be it known that I, DAVID A. FLANIGAN, a resident of Virgin, in the county of Washington and State of Utah, a citizen of the United States, have invented certain new and useful Improvements in Helicopters, of which the following is a specification.

My invention relates to improvements in helicopters one object being the provision of aircraft of this character which will rise from the ground with ease and certainty and which can be caused to travel at the desired height under the easy control of the aviator.

Another object of my invention is the provision of aircraft of the type or character stated which may be made of any desired size according to conditions and circumstances and which will be comparatively light in weight but possess great strength and durability.

Another object of my invention is the provision of a helicopter which will dispose the motors and the lifting and traveling planes and other associated mechanism in the most advantageous relation to permit ready access to any of its parts when found necessary.

Another object of my invention is the provision of a machine which will be comparatively small and compact in size, which will be of simple, durable and inexpensive construction and in all important respects thoroughly practical and efficient.

With these objects in view, my invention consists of a helicopter embodying novel features of construction and combination of parts, substantially as described and defined by the claim and as shown in the accompanying drawings, in which:

Referring by letter to the drawings, in which the same letters of reference are used to designate the same parts in all the views.

Figure 1:
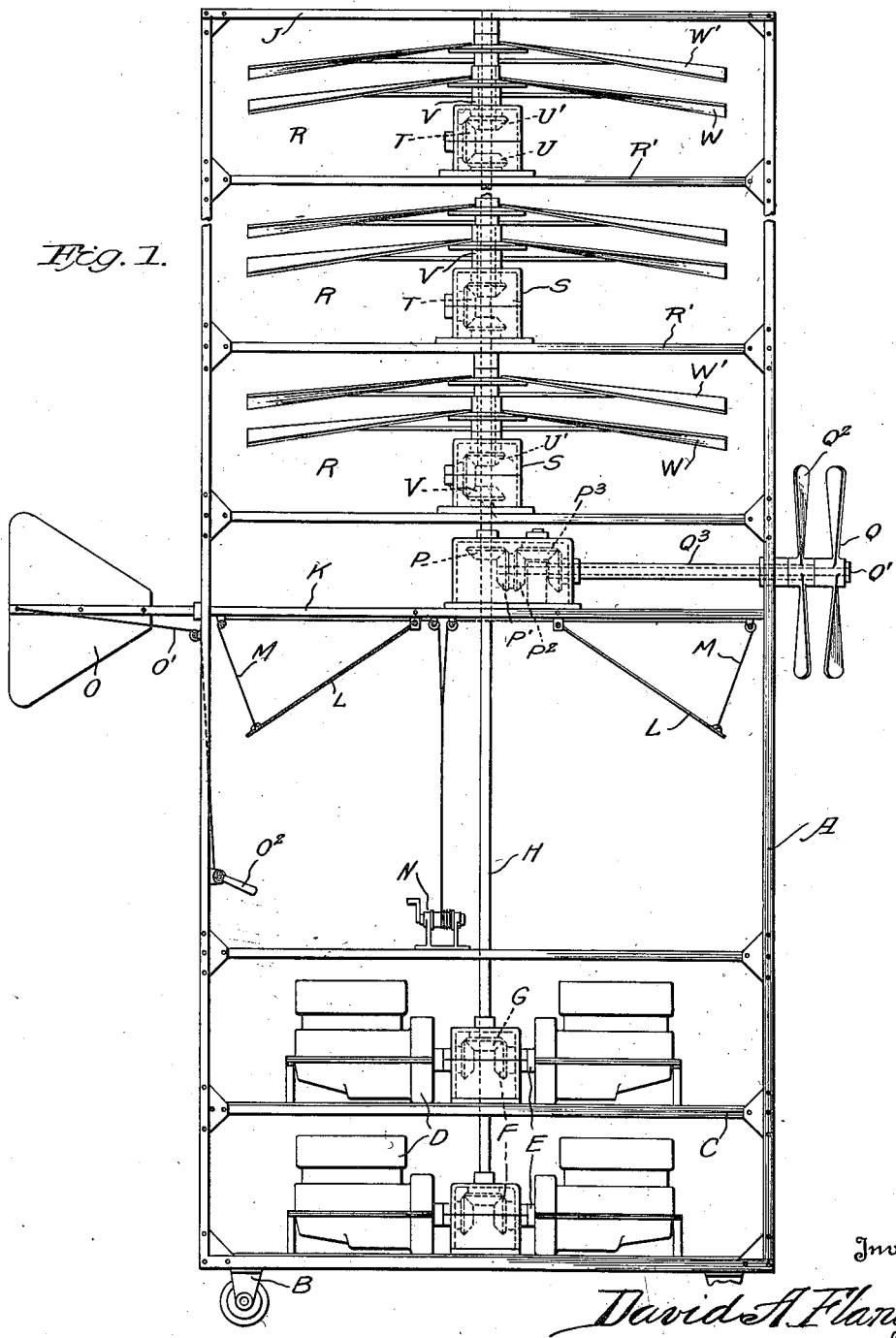
Figure 1 represents a side elevation of a helicopter constructed in accordance with and embodying my invention.
Figure 2:
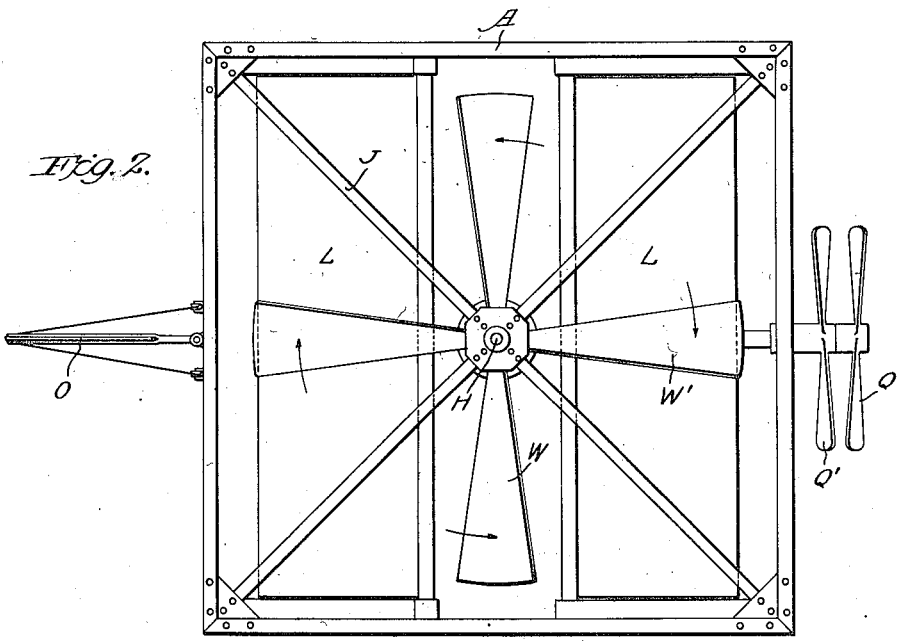
Fig. 2 represents a top plan view.
Figure 3:
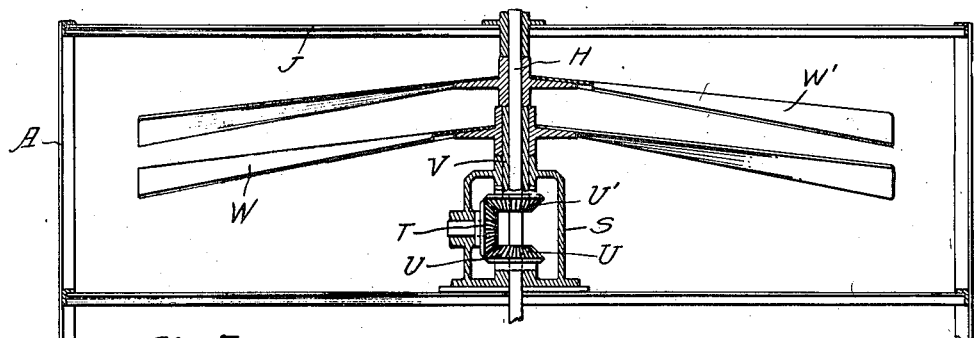
Fig. 3 represents an enlarged sectional view showing the arrangement of the lifting wings or planes and the mechanism for driving the same.

The letter A designates the supporting structure or framework of my machine, which in general forms a structure of vertical rectangular form supported upon a suitable landing gear B, and provided in its lower portion with a motor supporting frame C, which supports the series of motors D, four being shown in this instance, whose shafts E carry bevel gears F, which engage or mesh with the pair of similar bevel gears G, on the vertical driving shaft H. From this construction, it will be observed that the four motors are geared to drive the single vertical driving shaft H, which shaft passes upward and is journaled at its top in the frame at J.

Mounted about midway of the frame is the supporting structure K, to which are pivoted the doors or flaps L, which are controlled by the cords or cables M, which are wound upon the hand controlled windlass N, the purpose of such doors being to control the air pressure in the upper portion of the frame structure. The machine is further provided with the guiding means O, controlled manually by the cords or cables O', and the handle $O^2$, while the driving shaft H adjacent the supporting structure K carries the beveled gear P, which meshes with the gear P' which in turn drives the beveled gear $P^2$, which in turn drives the beveled gear $P^3$, which construction of gearing rotates the propeller Q, on the shaft Q' and the propeller $Q^2$, on the sleeve $Q^3$, in opposite directions.

The upper structure of the frame is divided into a series of compartments R, three being shown in this instance and upon the horizontal supports R' in said compartment are mounted the casings S, in each of which is supported a beveled gear wheel T, the three beveled gear wheels T, meshing with the gear wheels U, on the driving shaft H and the gear wheels U' on the sleeves V, the sleeves V carrying wings or blades W and the driving shaft carrying wings or blades W', the arrangement thus described causing the blades or wings W to revolve in one direction and the blades or wings W' to revolve in the opposite direction, thus the single driving shaft through its form of gear connection drives both sets of wings in opposite directions.

From the foregoing description taken in connection with the drawings it will be observed that the motors are disposed in the lower portion of the machine, the guiding mechanism and the forward traveling propellers and the air regulating means are disposed intermediately of the frame; while the series of lifting sets of blades are disposed in the upper portion of said frame and that the single series of motors through the medium of a single driving shaft operates the propellers and the lifting blades from a single driving shaft.

It will be apparent that a machine constructed according to my invention will be comparatively light in weight while possessing the necessary strength and durability; that the parts are disposed to provide a small and compact structure of simple and inexpensive construction; and that the machine may be easily controlled by the aviator under all conditions, thus insuring a practical improvement in this class of inventions.

I claim:

A helicopter consisting of a rectangular vertical frame, a motor supporting portion in the lower end of said frame, motors arranged in said lower end, a single driving shaft geared to be driven from said motors and extending throughout the height of said frame, a series of cases mounted in the upper end of said frame and forming bearings and guides for said driving shaft, a series of vertically disposed beveled gears mounted in said cases, a series of beveled gears meshing with said vertical gears and carried by the driving shaft, a series of gears also meshing with said vertical gears and mounted on sleeves, and a series of lifting blades carried by the driving shaft and sleeves and operated from said driving shaft.

In testimony whereof I hereunto affix my signature.

DAVID A. FLANIGAN.